Patented Apr. 23, 1935

1,998,794

UNITED STATES PATENT OFFICE 1,998,794

PROCESS FOR PRODUCING P-NITRO-O-ANISIDINE

John M. Tinker and Louis Spiegler, South Milwaukee, Wis., assignors to E. I. du Pont de Nemours & Company, Wilmington, Del., a corporation of Delaware No Drawing. Application January 25, 1932, Serial No. 588,815

9 Claims. (Cl. 260—130.5)

This invention relates to a process for preparing p-nitro-o-anisidine ($OCH_3:NH_2:NO_2=1:2:4$). It is an object of this invention to provide a process for preparing p-nitro-o-anisidine whereby the same is obtained in good yield and substantially free of isomeric nitro bodies. Other and further important objects of this invention will appear as the description proceeds.

By p-nitro-o-anisidine we are referring herein to 4-nitro-2-amino-anisole,

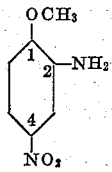

the positions ortho and para being oriented with respect to the $OCH_3$ group.

p-Nitro-o-anisidine has been produced in the art by nitrating an N-acidyl derivative of o-anisidine, such as 2-N-acetylamino-1-anisole. Other methods proposed in the art involved the reduction of dinitro-anisole. It has also been proposed to prepare p-nitro-o-anisidine by nitrating o-anisidine base in a medium of sulfuric acid. It has been observed, however, that this process does not furnish a good product. (Freyss, Bull. Soc. Ind., Mulhouse, vol. 70, page 378.)

We have now found that by using the last mentioned process and combining it with a special method of recovery, p-nitro-o-anisidine may be obtained in good yield and highly pure state. More particularly, we found that o-anisidine can be nitrated directly in sulfuric acid medium without previous acidylation of the amino group, and that this method leads predominantly to the formation of p-nitro-o-anisidine in good yield and substantially free of the 5-nitro isomer. We have further found that the p-nitro-o-anisidine produced by this method can be readily isolated from the reaction mass and freed from any by-products or isomers by conversion of the nitro-anisidine into an aryl-sulfonate thereof, as more fully described below. Moreover, by suitable control of the conditions of nitration the formation of said by-products or isomers can be reduced to a minimum.

Based on the above discovery, our preferred process comprises the treatment of o-anisidine in concentrated sulfuric acid with a sulfuric-acid-nitric-acid mixture, at reduced temperatures, to form p-nitro-o-anisidine. The nitration mass is then diluted with water and reacted with an aqueous solution of sulfonated naphthalene or a water-soluble salt thereof to form the naphthalene-sulfonic-acid salt of 2-amino-4-nitro-anisole, which precipitates and may be filtered off. Treatment of the filter cake with aqueous alkali then liberates the free base of 4-nitro-2-amino-anisole which may again be filtered off from the aqueous solution of naphthalene alkali sulfonates.

The first step in our process, namely the nitration in sulfuric acid, may be carried out in any suitable manner, as will be readily understood to one skilled in the art. For instance, if concentrated sulfuric acid (monohydrate) and relatively anhydrous nitrating mixture (about 5% $H_2O$) be used, exceptionally high yields of p-nitro-o-anisidine are obtained. However, wide variation is possible both in the concentration of $H_2SO_4$ employed and in the strength of the nitrating mixture. If desired, concentrated nitric acid may be used instead of the standard nitric acid-sulfuric acid mixture. The use of nitric acid relatively more diluted with water will at worst affect only the yield of p-nitro-o-anisidine but not its purity after it has been isolated by our preferred method. In any event, this effect can be readily overcome by increasing the quantity of $H_2SO_4$ used as a solvent.

If desired, an inorganic nitrate, such as sodium or potassium nitrate, may be used in lieu of nitric acid, the latter being formed in the reaction mass by part of the $H_2SO_4$ employed as a solvent.

The quantity of nitric acid used should preferably be as nearly quantitative (1 mol. of $HNO_3$ to each mol. of o-anisidine) as possible. While a few per cent excess are permissible, in fact desirable, excesses over 10% should be avoided to prevent formation of appreciable quantities of di-nitro bodies.

The quantity of sulfuric acid employed should be sufficient to keep the entire mass in solution throughout the nitration. About 4 to 6 parts of $H_2SO_4$ to each part of anisidine used will accomplish this result.

The temperature of the nitration mass should preferably be kept as low as possible, below room temperature, to prevent oxidation of the reacting mixture. 0-5° C. constitutes a very advantageous range.

The second step in our preferred process, namely the recovery of p-nitro-o-anisidine from the nitration mass, is best accomplished by reacting the mass with an aryl sulfonic acid to form the corresponding aryl sulfonates of the various nitro-o-anisidines present in the mixture. To effect this reaction, the nitration mass is poured into water, and an aqueous solution of an aryl-sulfonic acid or salt thereof is added. Alpha-naphthalene-sulfonic acid, beta-naphthalene-sulfonic acid, 1,5-naphthalene-disulfonic acid or other sulfonic acids of the naphthalene, benzene or anthraquinone series may be used for this purpose. In view of this fact it is even more advantageous to use a sulfonation mass of naphthalene directly as obtained in the sulfonation of naphthalene, except for dilution, without troubling to isolate any particular constituents thereof.

Having mixed the two aqueous solutions, the desired sulfonic acid salt of the p-nitro body crystallizes out and may be recovered by filtration. If it is desired to obtain the free base, the filter cake is treated with an aqueous solution of alkali, such as caustic alkali, soda ash or ammonia. The free base of 4-nitro-2-amino-anisole then precipitates and may be filtered off, while the mother liquor contains the corresponding alkali-metal salt of the naphthalene sulfonic acids used, and may be employed for salting out the p-nitro-o-anisidine from a subsequent nitration batch.

Without limiting our invention to any particular procedure, the following example, in which parts by weight are given, will serve to illustrate our preferred mode of operation.

*Example*

100 parts of freshly distilled o-anisidine are dissolved in 490 parts of sulfuric acid monohydrate, while maintaining the temperature below 30° C. The mass is cooled to 0° C., and 147 parts of a mixed acid, whose composition is 36% nitric acid, 58% sulfuric acid, and 6% water, are gradually dropped in. After stirring for 3 to 4 hours, the nitration mass is diluted with 1250 parts of water. A naphthalene sulfonic acid mixture, as obtained by sulfonating 130 parts of naphthalene at below 60° C. with 260 parts of sulfuric acid (monohydrate) and diluting the sulfonation mass with water to 1000 parts (and containing mostly alpha-naphthalene-sulfonic acid) is now introduced, whereupon the p-nitro-anisidine precipitates as the alpha-naphthalene-sulfonate. To obtain the free p-nitro-anisidine, the filter cake is washed with water until free of acid, boiled in a mixture of 1250 parts of water and 73 parts of sodium carbonate, filtered and dried.

4-nitro-2-amino-anisole is thus obtained in high yield and great purity (M. P. 116°–117° C.). When recrystallized once from xylene it has a melting point of 118.5–119° C.

Instead of the specific sulfonation mixture above used, other aryl-sulfonic acids may be used, for instance, beta-naphthalene-sulfonic acid, 1,5-naphthalene-disulfonic acid, nitrobenzene-sulfonic acid, anthraquinone-2,7-disulfonic acid, and so forth.

It will be understood that many other variations and modifications are possible in our preferred procedure without departing from the spirit of this invention.

We claim:

1. In a process for preparing 4-nitro-2-amino-anisole the steps which comprise dissolving o-anisidine in sulfuric acid, reacting upon the solution with a nitrating agent containing nitric acid under mononitrating conditions, diluting the reaction mass, reacting upon the latter with an aryl sulfonic acid compound, and recovering the aryl sulfonate of 4-nitro-2-amino-anisole.

2. In a process for preparing 4-nitro-2-amino-anisole the steps which comprise dissolving o-anisidine in sulfuric acid, reacting upon the solution with a nitrating agent containing nitric acid under mononitrating conditions, diluting the reaction mass, reacting upon the latter with a naphthalene sulfonic acid compound, and recovering the naphthalene-sulfonic acid salt of 4-nitro-2-amino-anisole.

3. In a process for preparing 4-nitro-2-amino-anisole the steps which comprise mononitrating o-anisidine in a medium of sulfuric acid diluting the reaction means, adding an aqueous solution of naphthalene sulfonic acid, and filtering off the precipitated naphthalene-sulfonic acid salt of 4-nitro-2-amino-anisole.

4. A process for preparing 4-nitro-2-amino-anisole which comprises mononitrating o-anisidine in a medium of sulfuric acid, diluting the reaction mass, adding an aqueous solution of naphthalene sulfonic acid, filtering off the precipitated naphthalene-sulfonic acid salt of 4-nitro-2-amino-anisole, and reacting upon the filter cake with alkali to recover 4-nitro-2-amino-anisole in the form of its free base.

5. A process for preparing 4-nitro-2-amino-anisole which comprises dissolving o-anisidine in sulfuric acid, reacting upon the solution at ice-bath temperature with a nitrating agent containing nitric acid under mononitrating conditions, diluting the reaction mass, adding an aqueous solution of alpha-naphthalene sulfonic acid, filtering off the precipitated alpha-naphthalene-sulfonic acid salt of 4-nitro-2-amino-anisole, and reacting upon the filter cake with alkali to recover 4-nitro-2-amino-anisole in the form of its free base.

6. In a process for preparing 4-nitro-2-amino-anisole by direct mononitration of o-anisidine, the steps which comprise reacting the nitration mass with an aryl-sulfonic acid and recovering the precipitated aryl-sulfonate of 4-nitro-2-amino-anisole.

7. In a process for preparing 4-nitro-2-amino-anisole by direct nitration of o-anisidine at ice-bath temperature, the steps which comprise reacting the nitration mass with an aryl-sulfonic acid and recovering the precipitated aryl-sulfonate of 4-nitro-2-amino-anisole.

8. In a process for preparing p-nitro-o-anisidine by direct nitration of o-anisidine at a temperature of between 0 and 5° C., the steps which comprise reacting the nitration mass with an aryl-sulfonic acid and recovering the precipitated aryl-sulfonate of p-nitro-o-anisidine.

9. In a process for preparing p-nitro-o-anisidine by reacting upon o-anisidine in sulfuric acid with a nitrating agent containing nitric acid at a temperature between 0 and 5° C., the steps which comprise diluting the nitration mass, reacting upon the latter with a naphthalene sulfonic acid compound and recovering the naphthalene sulfonic acid salt of p-nitro-o-anisidine.

JOHN M. TINKER.
LOUIS SPIEGLER.

CERTIFICATE OF CORRECTION.

Patent No. 1,998,794.                                              April 23, 1935.

JOHN M. TINKER, ET AL.

It is hereby certified that error appears in the printed specification of the above numbered patent requiring correction as follows: Page 2, second column, line 16, claim 3, after "acid" insert a comma; and line 17, of said claim, for "means" read mass; and that the said Letters Patent should be read with these corrections therein that the same may conform to the record of the case in the Patent Office.

Signed and sealed this 11th day of June, A. D. 1935.

Leslie Frazer (Seal)                                                    Acting Commissioner of Patents.